US012191602B2

(12) United States Patent
Foung

(10) Patent No.: US 12,191,602 B2
(45) Date of Patent: Jan. 7, 2025

(54) QUICK RELEASE DEVICE FOR RELEASING AN ELECTRICAL MODULAR CONNECTOR FROM AN ELECTRICAL JACK

(71) Applicant: Lingang Foung, Cranbury, NJ (US)

(72) Inventor: Lingang Foung, Cranbury, NJ (US)

( * ) Notice: Subject to any disclaimer, the term of this patent is extended or adjusted under 35 U.S.C. 154(b) by 388 days.

(21) Appl. No.: 17/890,236

(22) Filed: Aug. 17, 2022

(65) Prior Publication Data

US 2023/0133450 A1 May 4, 2023

Related U.S. Application Data

(63) Continuation-in-part of application No. 17/701,667, filed on Mar. 23, 2022, now Pat. No. 11,502,451.

(60) Provisional application No. 63/273,098, filed on Oct. 28, 2021.

(51) Int. Cl.
*H01R 13/633* (2006.01)
*H01R 13/627* (2006.01)

(52) U.S. Cl.
CPC ..... *H01R 13/6335* (2013.01); *H01R 13/6272* (2013.01)

(58) Field of Classification Search
CPC ...... H01R 13/633–635; H01R 13/6272; H01R 13/625
USPC ................................................. 439/352, 676
See application file for complete search history.

(56) References Cited

U.S. PATENT DOCUMENTS 11,502,451 B1 * 11/2022 Foung .................. H01R 13/635

* cited by examiner

*Primary Examiner* — Gary F Paumen
(74) *Attorney, Agent, or Firm* — Changi Wu; Changi Wu Law Office

(57) ABSTRACT

A quick release device for releasing an electrical modular connector comprises a connector boot attached to the network cable and assembled with the electrical modular connector; a passage formed on a top side of the connector boot, wherein the passage comprises first, second, and third structures together with the top of the connector boot to enclose the passage as a tunnel; a slide insert having a first and a second ends opposed to the first end, wherein the slide insert is positioned through the passage, wherein the first end faces the electrical jack; and a rotatable hook having a free end and a pivot end configured to pivot on the first end of the slide insert along a longitudinal direction of the slide insert, wherein the free end of the rotatable hook engages with a clip and bias the clip to release the electrical modular connector from the electrical jack when the slide insert moves away from the electrical jack.

20 Claims, 10 Drawing Sheets

QUICK RELEASE DEVICE FOR RELEASING AN ELECTRICAL MODULAR CONNECTOR FROM AN ELECTRICAL JACK

CROSS-REFERENCE RELATED TO RELATED APPLICATIONS

This application claims the benefits and priority of the U.S. Provisional application Ser. No. 17/701,667, which is incorporated herein by reference in its entirety. The U.S. Provisional application Ser. No. 17/701,667 further claims the benefits and priority of the U.S. Provisional Application No. 63/273,098, filed on Oct. 28, 2021, which is incorporated herein by reference in its entirety.

BACKGROUND

An industrially standardized electrical modular connector is normally configured to be released from an electrical jack by a user's pressing on the clip of the electrical modular connector. While using the electrical modular connector in a high-density patch panel, user's fingers cannot reach the clip of an electrical modular connector in the last row of the patch panel. Some of the high-density patch panels designed to recess in the equipment make user even more difficult to access the electrical modular connector clip. Various devices attempted to solve the problem but unsuccessfully. The electrical modular connector is for a standardized registered jack designated by the Federal Communications Commission (FCC) and under International Electrotechnical Commission's IEC 603-7 Standards as well as American National Standards Institute's ANSI-TIA-1096-A Standards. In solving such problem, some had tried to modified the standardized electrical modular connectors to fit their attempted trials but the modifications from the standardized electrical modular connectors will limit the application only to customized shapes or configurations of the connectors. The modification costs are higher than the use of the standardized connectors. Some prior inventions of the electrical modular connectors teach a quick release mechanism by modifying the tip of the clip of the electrical modular connector to fit the inventions, which is not desired by the industry of network devices because the clip from those prior invention will need a cost and time of customization, instead of using standard clip as by FCC or other standards that are easily obtained from the market.

BRIEF SUMMARY

A quick release device for releasing an electrical modular connector of a network cable from an electrical jack comprises a connector boot attached to the network cable and assembled with the electrical modular connector; a passage formed on the connector boot, a passage formed on a top side of the connector boot, wherein the passage comprises a first structure, a second structure, and a third structure together with the top of the connector boot to enclose the passage as a tunnel; a slide insert having a first end and a second end opposed to the first end, wherein the slide insert is positioned through the passage, wherein the first end faces the electrical jack; and a rotatable hook having a free end and a pivot end configured to pivot on the first end of the slide insert along a longitudinal direction of the slide insert, wherein the free end of the rotatable hook engages with a clip and causes the clip to move relatively downwardly to release the electrical modular connector from the electrical jack when the slide insert moves away from the electrical jack.

BRIEF DESCRIPTION OF THE DRAWINGS

The drawings below illustrate only some embodiments of the present invention and not to be considered limitations of the invention or equivalence of the embodiments.

DETAILED DESCRIPTION

Figure 1:
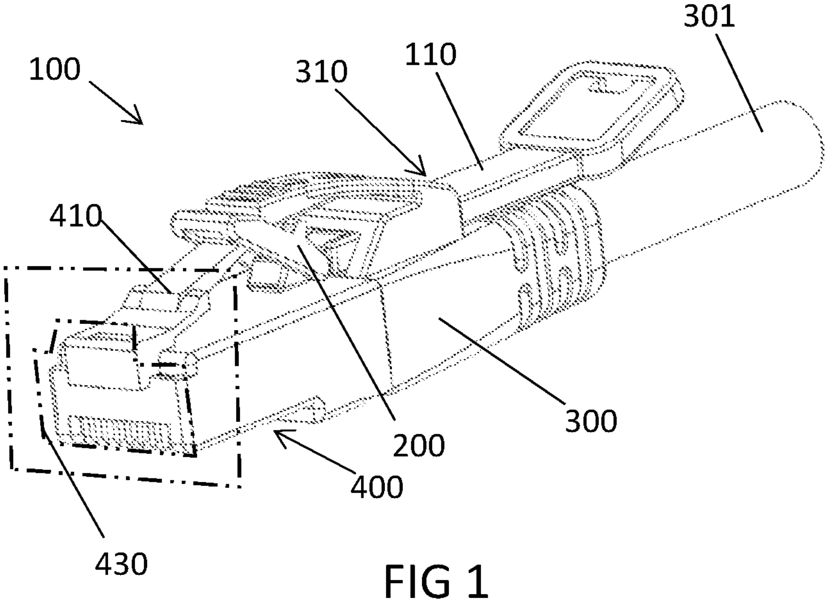
FIG. 1 is a prospective view of one embodiment of the invention when the electrical modular connector is engaged with the electrical jack.

Before the present invention is described in greater detail, it is to be understood that this invention is not limited to particular embodiments described, and as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" may also include the plural referents unless the context clearly dictates otherwise.

It is further noted that the claims may be drafted to exclude any element that may be optional. As such, this statement is intended to serve as antecedent basis for use of such exclusive terminology as "solely", "only" and the like in connection with the recitation of claim elements, or the use of a "negative" limitation.

As will be apparent to those of ordinary skill in the art upon reading this disclosure, each of the individual embodiments described and illustrated herein has discrete components and features which may be readily separated from or combined with the features of any of the other several embodiments without departing from the scope or spirit of the present invention.

The invention is directed to a device for quickly releasing of an electrical modular connector for a network cable from an electrical jack. In one of the embodiments of the present invention as shown in FIGS. 1, 2, 3, and 4, the device 100 comprises a slide insert 110 having a first end 112 and a second end 114 opposed to the first end 112, wherein the slide insert 110 is positioned through the passage, wherein the first end 112 faces or is closer to the electrical jack 430 and the second end 114 faces against the electrical jack 430. In this embodiment of the present invention, a rotatable hook 200 having a free end 204 and a pivot end 202 may be assembled or configured to the first end 112 of the slide insert 110 by the pivot end 202 and an at least one pivot hole 203 formed on the first end so that the rotatable hook 200 can freely pivot on the first end of the slide insert 110 in a rotational manner along a longitudinal direction of the slide insert, wherein the slide insert 110 resides on a top 320 of a connector boot 300 and may move forward and backward in a predetermined distance through a passage 310 formed or assembled on the top 320 of the connector boot 300 along the longitudinal direction of the connector boot 300, wherein the passage 310 comprises a first structure 311, a second structure 312, and a third structure 313 together with the top 320 to enclose the passage 310 as a tunnel. The first structure 311, the second structure 312, and third structure 313 can be in a form of wall, panel, bar, stud, rod, frame, or mechanical member that can physically be connected together with the top 320 of the boot or a top 420 of an electrical modular connector 400 to form the passage 310 as a tunnel.

Figure 2:
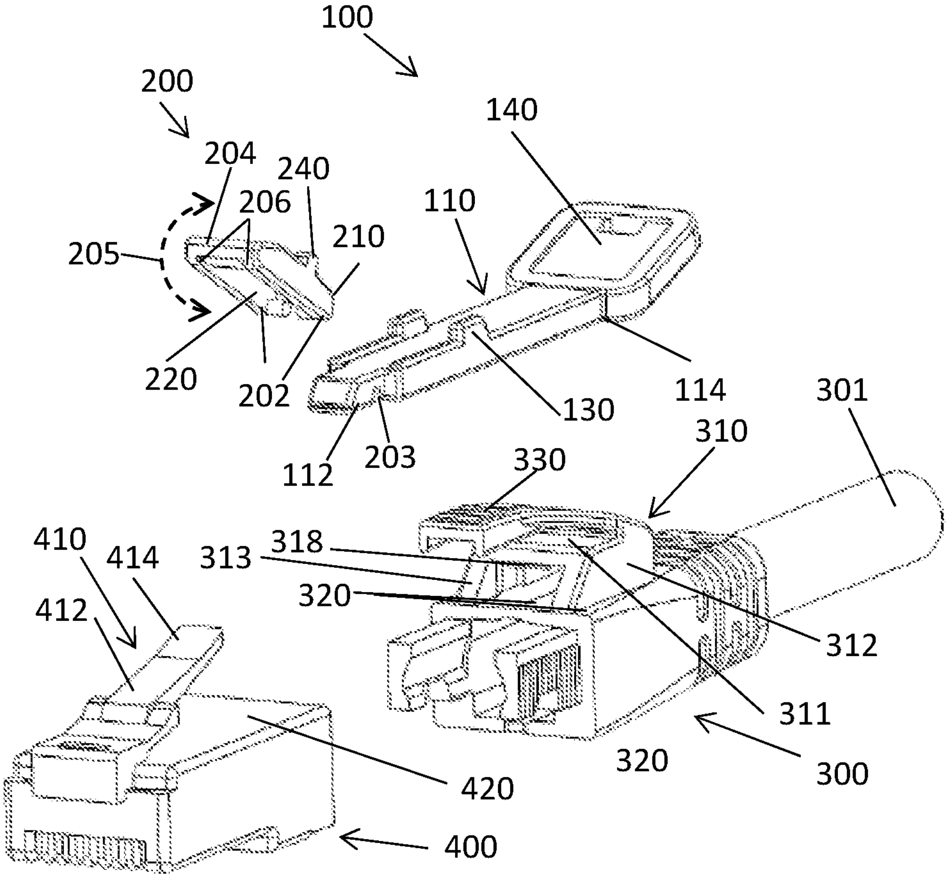
FIG. 2 is a prospective, explosive view of a partially disassembled one embodiment of the invention.
Figure 11:
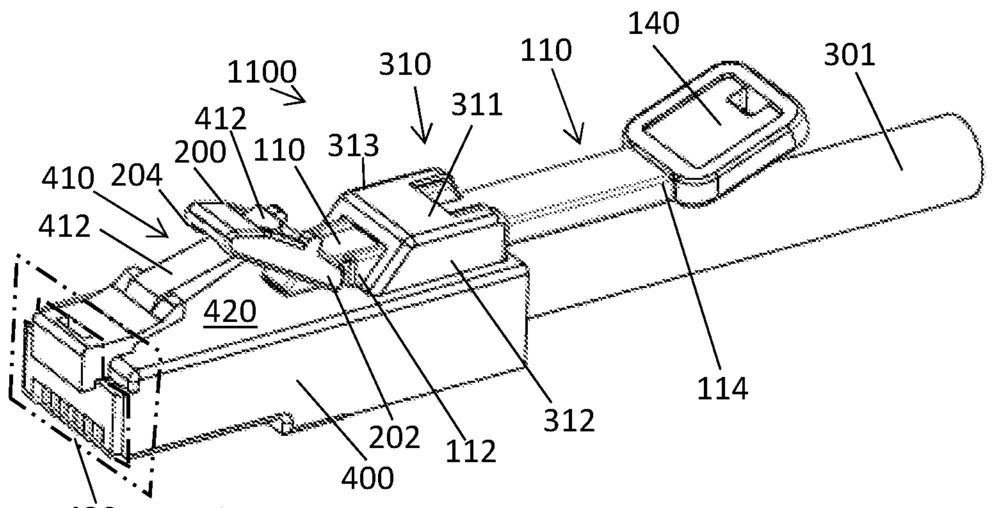
FIG. 11 is a prospective view of one embodiment of the invention.
Figure 12:
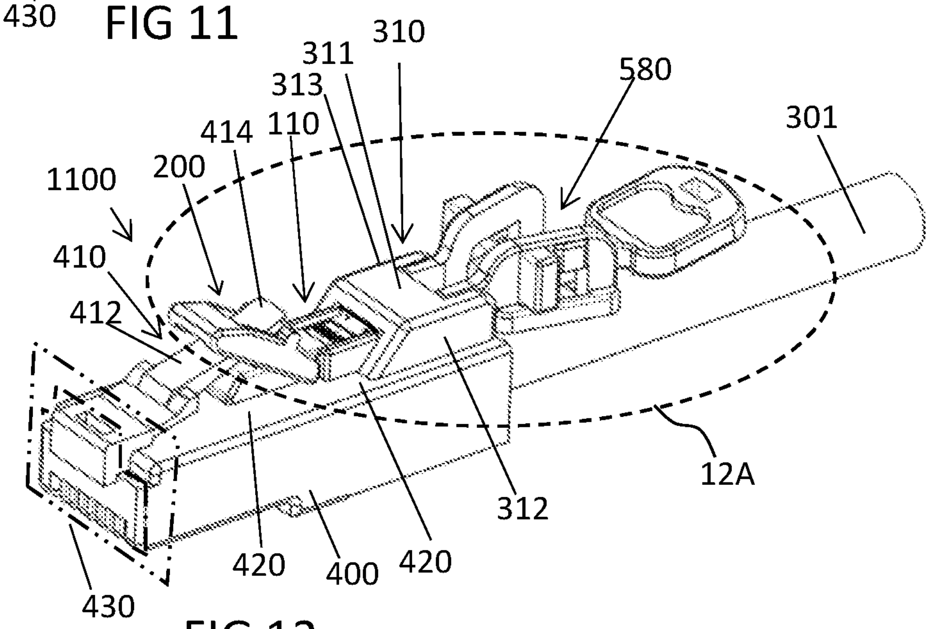
FIG. 12 is a prospective view of one embodiment of the invention.
Figure 13:
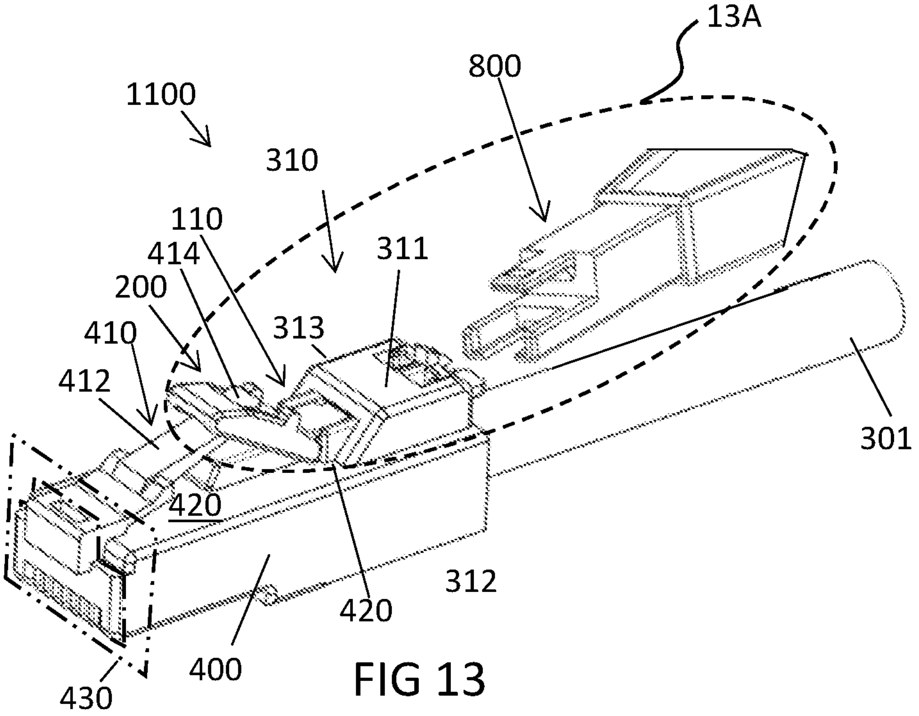
FIG. 13 is a prospective view of one embodiment of the invention.

As shown in FIGS. 1 and 2, in one embodiments of the invention, the modular connector 400 is configured to be connected or assembled with the connector boot 300, which is further connected or assembled with the network cable 301. As shown in FIGS. 11, 12, and 13, in another embodiment of the invention, the modular connector 400 may be configured to be connected or assembled with the network cable 301 without the connector boot 300.

Figure 4:
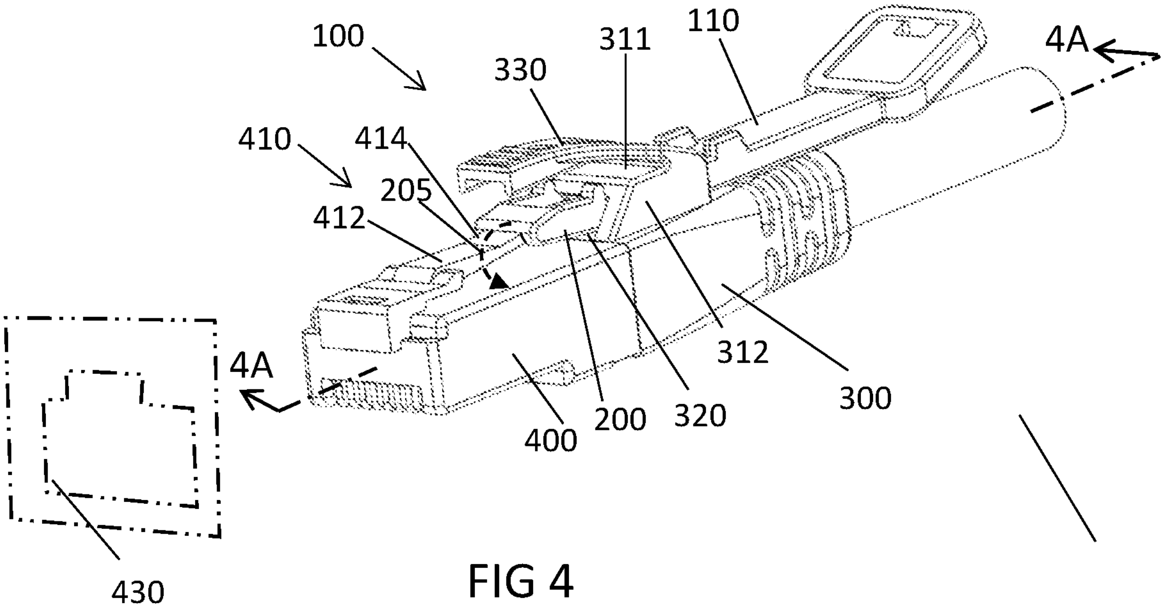
FIG. 4 is a prospective view of one embodiment of the invention when the electrical modular connector is disengaged with the electrical jack.

As shown in FIGS. 2 and 4, in one embodiments of the invention, the clip 410 further comprises a body 412 and a straight distal end 414 connected to the body 412, wherein the free end 204 of the rotatable hook engages with the straight distal end 414, but the straight distal 414 end is not affixed, snap-fit, or attached with the rotatable hook 200, and wherein the rotatable hook 200 biases the clip 410 to release the electrical modular connector 400 from the electrical jack 430 when the slide insert 110 moves away from the electrical jack 430.

Figure 1A:
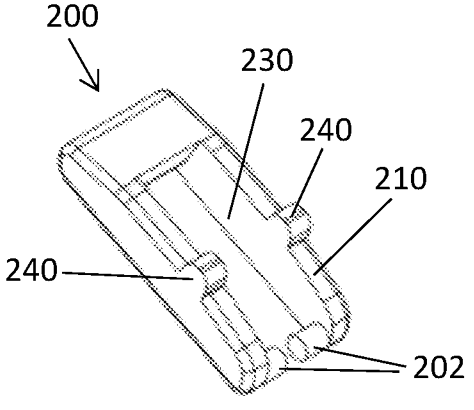
FIG. 1A is a prospective view of one embodiment of the hook of the invention.
Figure 1B:
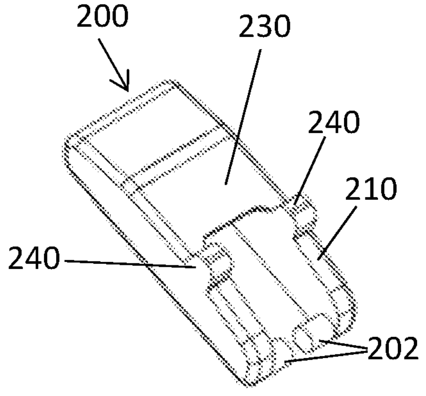
FIG. 1B is a prospective view of one embodiment of the hook of the invention.

As shown in FIGS. 1, 1A, and 1B, in one embodiment of the present invention, the pivot end 202 may be configured as a pair of protrusions on the rotatable hook 200 and a pair of recesses formed on the first end 112 of the slide insert 110, having substantially similar dimensions to the size and shape of the pair of protrusions so that the rotatable hook 200 may rotate freely in distal direction 205 on a longitudinal direction of the slide insert 110. The configuration of the pivot end 202 may be in other types, understood by a person having ordinary skill in the art, allowing the rotatable hook 200 to rotate on the pivot end 202.

In one of the embodiments of the present invention, in a position where the electrical modular connector is selectively connected with the electrical jack, the slide insert 110 is arranged to allow the free end 204 of the rotatable hook 200 to engage with a clip 410 of an electrical modular connector 400 when the slide insert 110 moves away or against the electrical jack 430; wherein the clip 410 further comprises a body 412 and a straight distal end 414 connected to the body 412, wherein the rotatable hook 200 may touch the straight distal end 414, but the straight distal end 414 is not affixed, snap-fit, or attached with the rotatable hook 200. The rotatable hook 200 may rotate around the pivot end 202 toward a top 420 of the electrical modular connector 400, relatively below or downward the clip 410 and may cause the clip 410 to move toward or relatively downward to the top 420 of the electrical modular connector

400 and release the electrical modular connector 400 from an electrical jack 430 when the slide insert 110 moves away from the electrical jack 430.

In one embodiments of the present invention, the downward movement of the clip 410, caused by the downward movement of the rotatable hook, releases the electrical modular connector 400 from an electrical jack 430. The aforementioned downward movement is a relative situation where the clip 410 of the electrical modular connector 400 is relatively above a top 420 of the electrical modular connector 400 when the electrical modular connector 400 engaged with the electrical jack 430 in a manner that the clip 410 is in a up direction. When the electrical jack is in an upside-down direction, the clip 410 of the electrical modular connector 400 will point downwardly, which the aforementioned downward movement of the clip 410 caused by the downward movement of the rotatable hook 200 will be relatively upward movements for both of the clip 410 and the rotatable hook 200 when the slide insert 110 moves away from the electrical jack 430. Similarly, if the electrical jack is installed on a sideway (90 degree from a vertical direction), the relatively downward movement of the clip 410 will now become a sideway toward to the top of the electrical modular connector.

The embodiments of the invention are not limited to have a rectangular shape for the slide insert 110, any shape, round, triangular, irregular, that allows the slide insert to move backward and forward in the passage 310 will also appreciated by a person having ordinary skill in the art.

Figure 5:
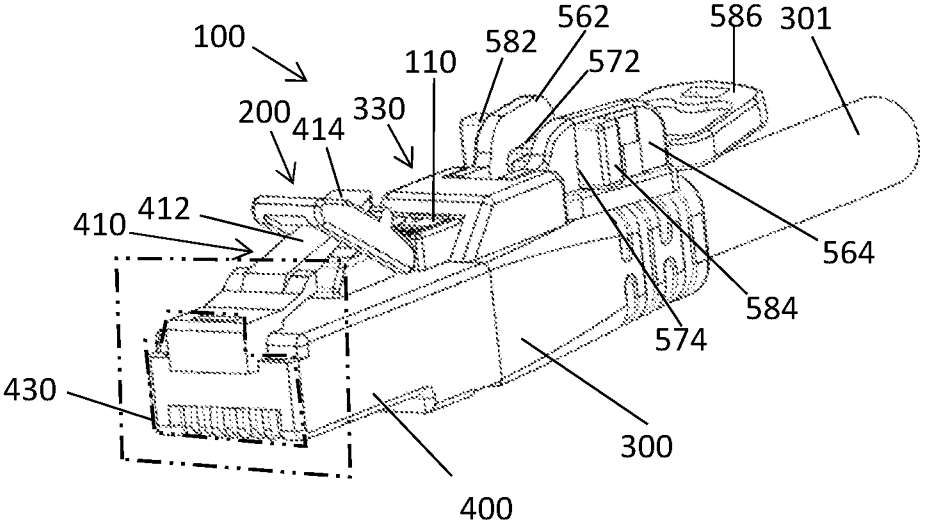
FIG. 5 is a prospective view of one embodiment of the invention when the electrical modular connector is engaged with the electrical jack.
Figure 9:
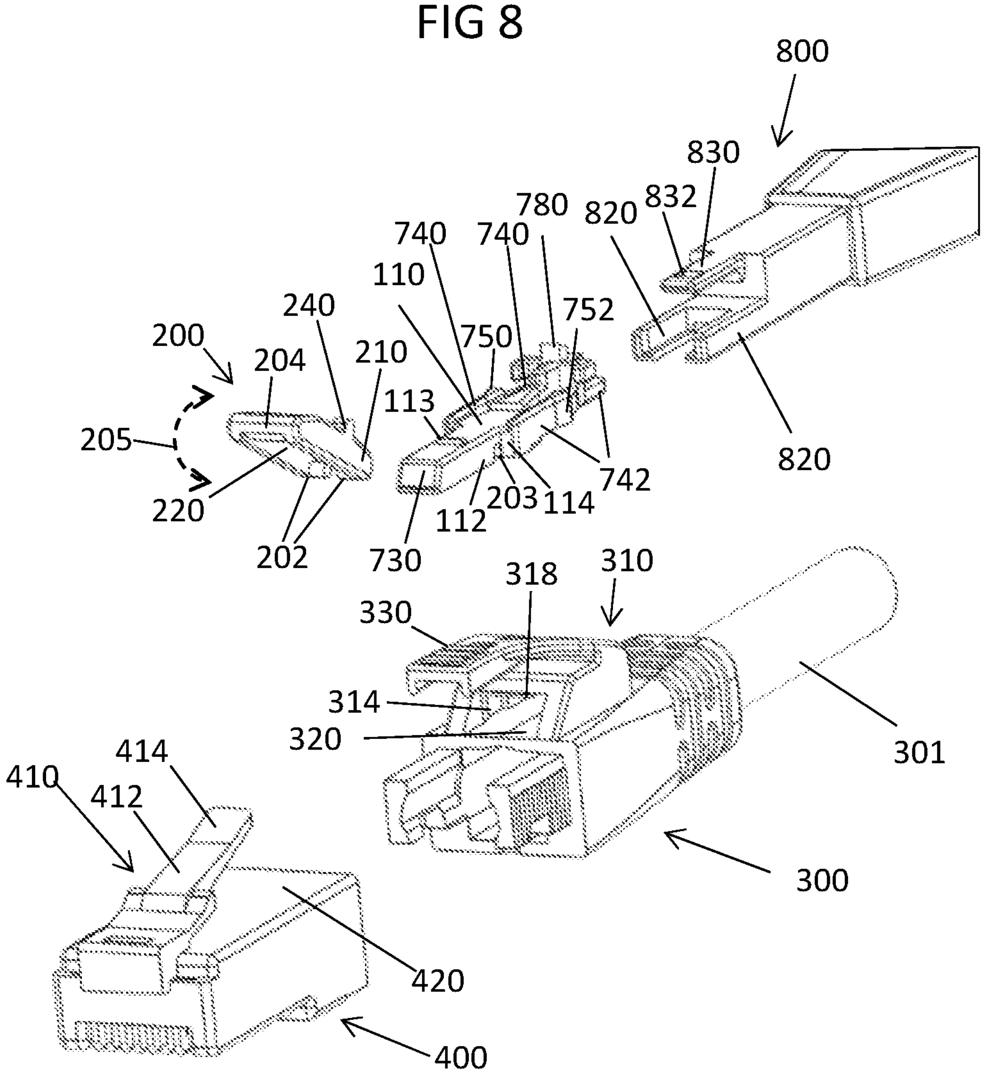
FIG. 9 is a prospective, explosive view of a partially disassembled one embodiment of the invention.

The rotatable hook may be a long-felt but unsolved needs to solve the problems to unplug or release an electrical modular connector from electrical jack in a high-density network panel. The rotatable hook and associated parts of the embodiments of quick release device can be applied to industrial-standard electrical modular connectors or similar modular connectors without substantial change or customization of the existing electrical modular connectors. The rotatable hook engages with the clip of the electrical modular connector by a pivot end, not a fixed end. A fixed end alike a clip protector 330 in FIGS. 1 to 4 may have the issue of material fatigue because a fixed end takes much more stress to the material that is normally made of plastics and is easy to break when by a frequent use and/or in a hot or cold environment, which often occurs to a network panel. The rotatable hook 200 comprises a curved top 210 and a recessed bottom 220. The curved top 210 of the rotatable hook 200 engages a top edge bar 318 of the passage 310 when the slide insert 110 moves away from the electrical jack 430. The curved top 210 is arranged to cause the rotatable hook to rotate angularly around the pivot end 202 and angularly, and relatively downwardly toward the top 420 of the electrical modular connector 400 or the top 320 of the connector boot 300 when the curved top 210 contacts with the top edge bar 318 of the passage 310 in a movement of the slide insert 110 moving on the top of connector boot 300 away from the electrical modular connector 400. A network cable 301 is attached to the connector boot 300 as shown in the figures. In one embodiment as shown in FIGS. 1, 5, 9, one straight distal end of the clip 410 may reside inside the recessed bottom 220 of the rotatable hook 200.

As shown in FIGS. 1 and 1A, in one embodiment of the present invention, an aperture 230 is formed on the curved top 210 of the rotatable hook 200, wherein a straight distal end of the clip 410 may extend through the aperture 230 when the electrical module connector is connected with the electrical jack 430. As shown in FIG. 1B, another embodiment of the rotatable hook 200, the aperture 230 may be partially covered. As shown in FIGS. 1A and 1B, in one embodiment, at least one protrusion 240 formed on the curved top 210 on a predetermined position so that it may stop the movement of the slide insert 110 and prevent from the slide insert from sliding out of the passage 310 of the connector boot 300. In one embodiment, at least one slide insert protrusion 130 is formed on the slide insert 110 to stop the slide insert 110 from moving further forward when the slide insert 110 is on a predetermined position that provides an engagement between the rotatable hook 200 and the clip 410 of the electrical modular connector 400. The slide insert 110 may further comprise a handle 140 extended from the second end 114 for easier operation of the device 100. The material suitable for the embodiments of the slide insert 110 and the rotatable hook 200 may be non-conductive or poorly conductive material and shall be sufficiently or substantially rigid to allow the movement of the slide insert 110 and rotatable hook 200 without substantial deformation. In one embodiment of the present invention, the rotatable hook 200 may comprise at least one curb 206 to prevent the clip 410 from moving sideways, as shown in FIG. 2.

Figure 4A:
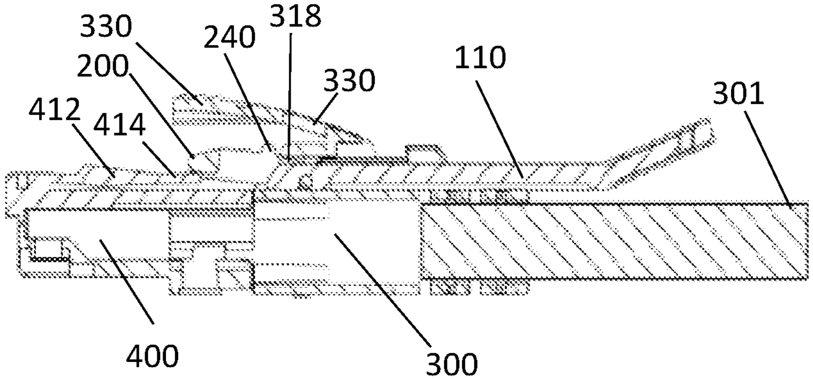
FIG. 4A is a sectional view of one embodiment of the invention depicted on FIG. 4 along section A-A when the electrical modular connector is disengaged with the electrical jack.

As shown in FIGS. 2, 4, and 4A, in one embodiment of the present invention, one slide insert protrusion 130 is further configured on the slide insert 110 between the passage 310 and the second end 114 of the slide insert 110 to provide a predetermined movement distance of the slide insert through the passage 310 so that the slide insert 110 may not entirely slide out of the passage or move too close to the clip 410 and so that the rotatable hook 200 may be in a predetermined position allowing an engagement with the clip 410.

Figure 3A:
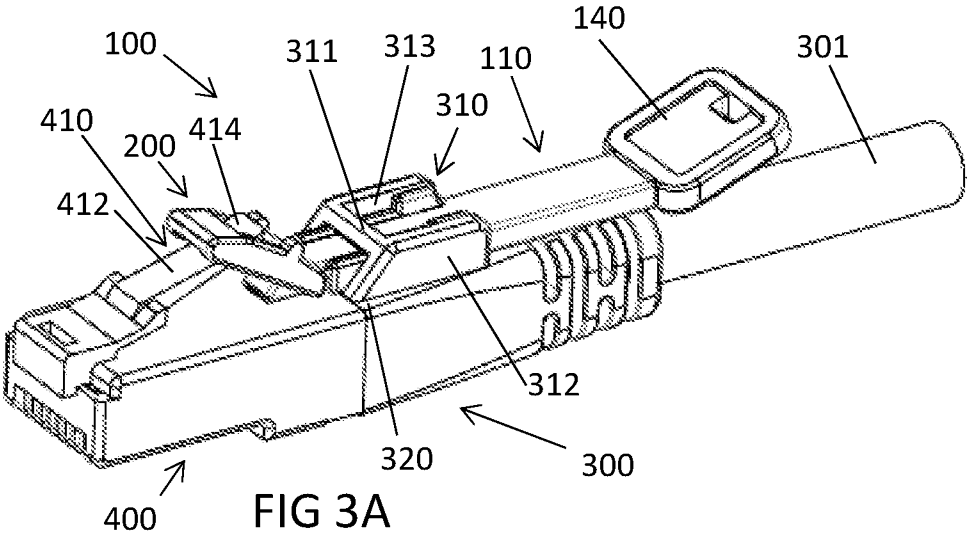
FIG. 3A is a prospective view of one embodiment featuring a fully open-topped passage of the invention when the electrical modular connector one embodiment of the invention.
Figure 3B:
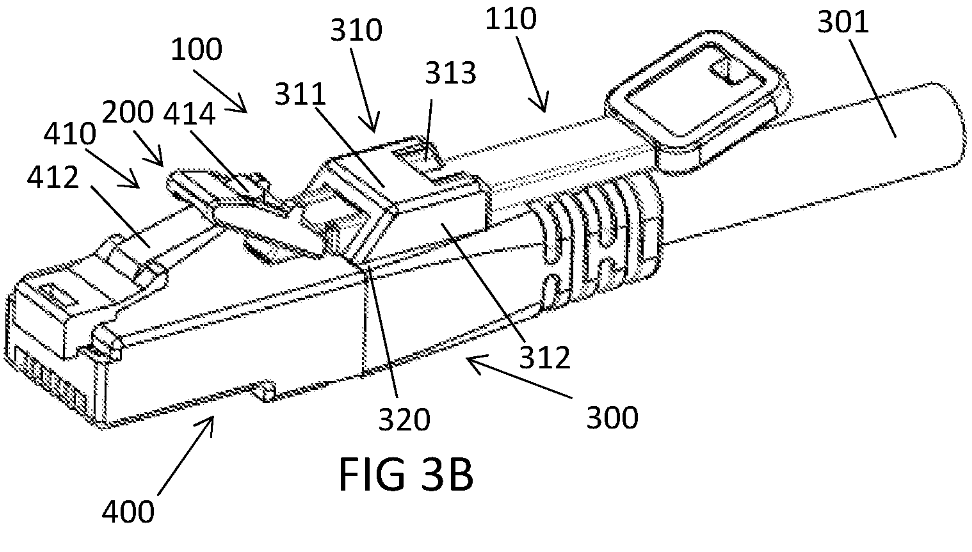
FIG. 3B is a prospective view of one embodiment featuring a partially open-topped passage of the invention when the electrical modular connector one embodiment of the invention.

In various embodiments of the present invention as shown in FIGS. 3, 3A and 3B, the passage 310 may be in various constructions, such as open-topped, partially covered, or fully covered as any construction or assembly that would be able to be understood or conceived by a person having ordinary skill in the art that the same can be performed by modifying or changing the subject matter within various conditions. However, the regardless whether the passage is fully-covered or partially-covered or open-topped, the passage is always enclosed by four sides of structures: the passage 310 is enclosed as channel by a first structure 311, a second structure 312, and a third structure 313 together with the top 320 of the connector boot and the passage 310 is affixed on the connector boot 300. The first structure 311, the second structure 312, and third structure 313 can be in a form of wall, panel, bar, stud, rod, frame, or mechanical member that can physically be connected together with the top 320 of the boot or a top 420 of an electrical modular connector 400 to form the passage 310 as a tunnel. Also shown in FIGS. 3, 3A and 3B, in various embodiments of the present invention, an optional clip protector 330 formed on the passage 310 is shown in FIG. 3 but not with the embodiments in FIG. 3A and FIG. 3B.

In one of the embodiments of the present invention as shown in FIGS. 5, 6, 7, and 7A, a quick release device 100 for quickly releasing an electrical modular connector from an electrical jack comprises a slide insert 110 having a first end 112 and a second end 114 opposed to the first end 112, wherein the slide insert 110 is positioned through the passage, wherein the first end 112 faces or is closer to the electrical jack 430 and the second end 114 faces away the electrical jack 430, wherein the passage 310 comprises a first structure 311, a second structure 312, and a third structure 313 together with the top 320 to enclose the passage 310 as a tunnel.

Figure 6:
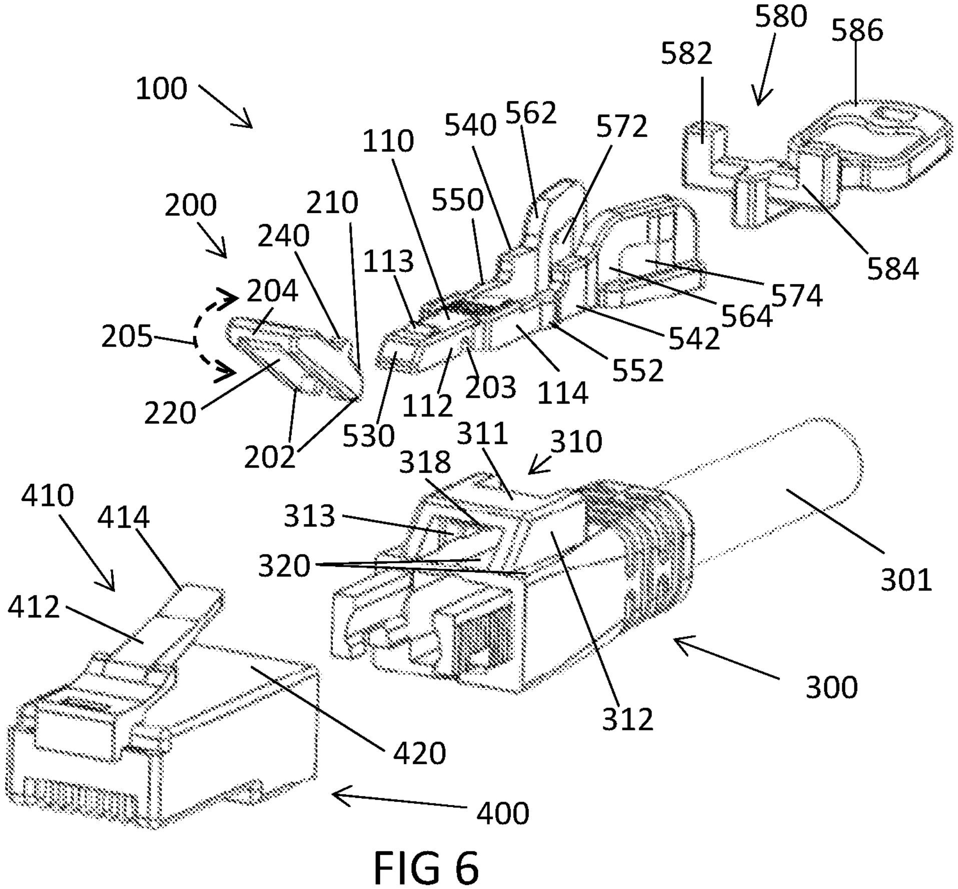
FIG. 6 is a prospective, explosive view of a partially disassembled one embodiment of the invention.
Figure 7:
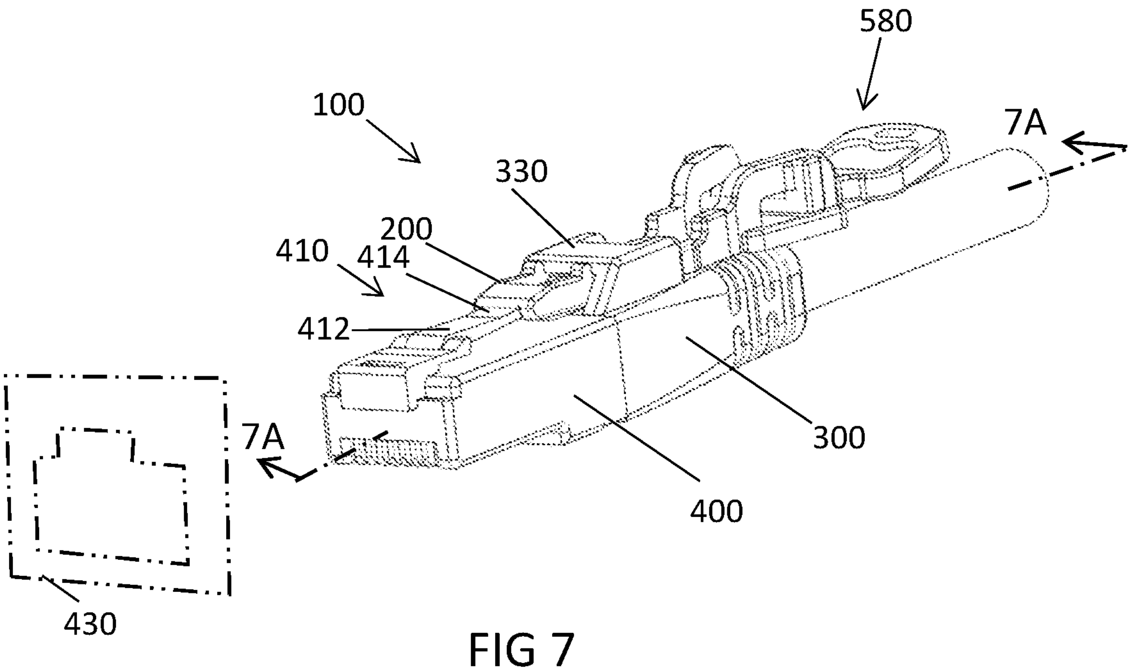
FIG. 7 is a prospective view of one embodiment of the invention when the electrical modular connector is disengaged with the electrical jack.
Figure 7A:
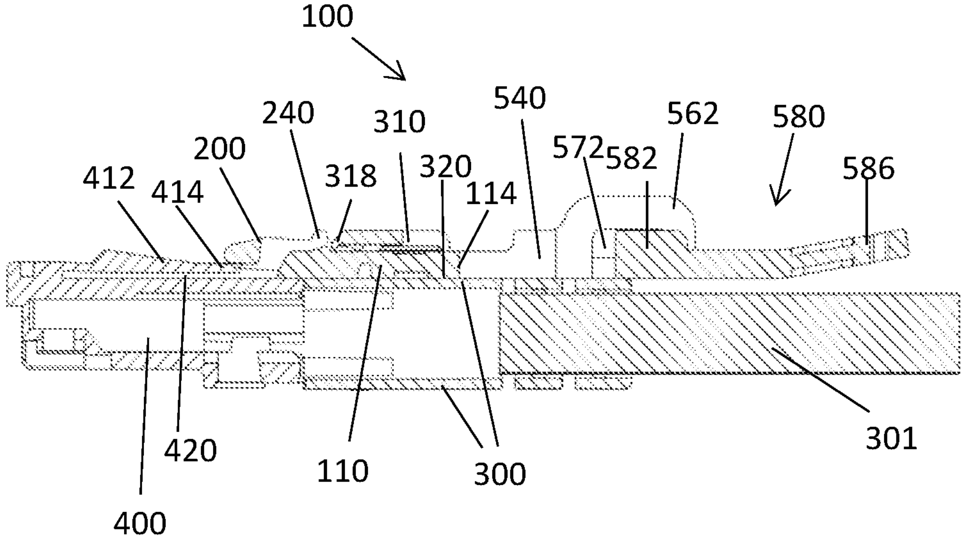
FIG. 7A is a sectional view of one embodiment of the invention depicted on FIG. 7 along section A-A when the electrical modular connector is disengaged with the electrical jack.

In this embodiment of the present invention as shown in FIGS. 5 and 6, a rotatable hook 200 having a free end 204 and a pivot end 202 may be assembled or configured to the first end 112 of the slide insert 110 by the pivot end 202 and an at least one pivot hole 203 formed on the first end 112 so that the rotatable hook 200 can freely pivot on the first end of the slide insert 110. As shown in FIGS. 5 and 6, in one embodiment of the present invention, the pivot end 202 may be configured as a pair of protrusions on the rotatable hook 200 and a pair of recesses formed on the first end 112 of the slide insert 110, having substantially similar dimensions to the size and shape of the pair of protrusions so that the rotatable hook 200 may rotate freely in distal direction 205 on a longitudinal direction of the slide insert 110. The configuration of the pivot end 202 may be in other types, understood by a person having ordinary skill in the art, allowing the rotatable hook 200 to rotate on the pivot end 202.

As shown in FIGS. 5, 6, 7, and 7A, in one embodiment of the slide insert 110 resides on a top 320 of a connector boot 300 and may move forward and backward in a predetermined distance through a passage 310 of the connector boot 300 on the top 320 of the connector boot along the longitudinal direction of the connector boot 300; a locking block 530 formed on the first end 112 of the slide insert 110 with a predetermined length and a predetermined height to block a downward movement of the clip 410 when the locking block 530 is substantially positioned under the clip; a first finger release arm 540 extended from the second end 114 of the slide insert 110; a second finger release arm 542 extended from the second end 114 of the slide insert 110; a first retaining protrusion 550 formed on the first finger release arm 540; a second retaining protrusion 552 formed on the second finger release arm 542; at least one recess 314 (one recess shown in FIG. 6 but another one recess hidden inside the passage 310 not shown) formed in the passage 310; wherein the first finger release arm 540 and the second finger release arm 542 are configured to be elastically deformed in response to a pressure applied on the first finger release arm 540 and the second finger release arm 542, wherein the first retaining protrusion 550 and the second retaining protrusion 552 are configured to selectively engage and disengage from at least one recess 314, and wherein the first retaining protrusion 550 and the second retaining protrusion 552 are disengaged from at least one recess 314 when the first finger release arm 540 and the second finger release arm 542 are pressed to retract toward each other.

Figure 8:
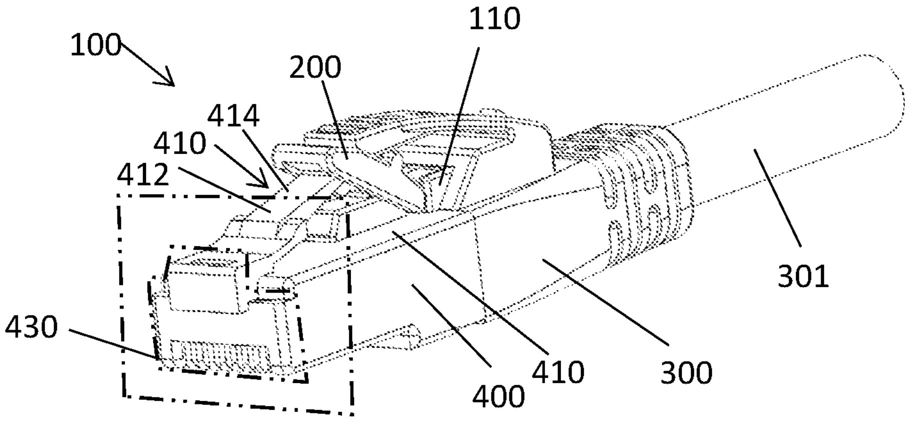
FIG. 8 is a prospective view of one embodiment of the invention when the electrical modular connector is engaged with the electrical jack.

In one embodiment, the locking block 530 has a with a predetermined length and a predetermined height to block a downward movement of the clip 410 when the locking block 530 is positioned substantially under the clip 410 to block the movement of the clip 410 and keep the electrical modular connector 400 from being disengaged from the electrical jack 430. In one embodiment of the present invention as shown in FIGS. 6 and 8, the slide insert 110 may reside on a top 320 of a connector boot 300 and may pass through a passage 310 of the connector boot 300 backward and forward, parallelly along the top 320 of the connector boots.

As shown in FIGS. 5, 6, 7, and 7A, in one embodiment of the present invention, the slide insert 110 is in an unlock position when the first finger release arm 540 and the second finger release arm 542 retract toward each other, which cause the first retaining protrusion 550 and the second retaining protrusion 552 being disengaged from the at least one recess 314 and enable the slide insert 110 to move away from the electrical modular connector 400.

In one of the embodiments of the present invention, the elastic deformations of the first finger release arm 540 and the second finger release arm 542 cause the first finger release arm 540 and the second finger release arm 542 to pivot inwardly toward to each other in a manner that the first retaining protrusion 550 on the first finger release arm 540 and the second retaining protrusion 552 on the second finger release arm 542 may be away and disengaged from at least one recess 314 formed in the passage, which will further enable the movement of the slide insert 110 to be unlock from the passage 310.

In one embodiment, when the slide insert 110 moves away from the electrical jack 430, the locking block 530 also moves away from the clip 410 and rotatable hook 200 may rotate around the pivot end 202 and rotate toward to or relatively downward toward to a top 420 of the electrical modular connector 400, which causes the clip 410 to move toward to or relatively downward toward to the top 420 of the electrical modular connector 400 and releases the electrical modular connector 400 from an electrical jack 430.

In one embodiment of the present invention as shown in FIGS. 1A and 1B, the rotatable hook 200 comprises a curved top 210 and a recessed bottom 220. The curved top 210 of the rotatable hook 200 engages a top edge bar 318 on the of the passage 310 when the slide insert 110 moves away from the electrical jack 430. The curved top 210 is arranged to cause the hook to move around the pivot end 202 and angularly and relatively downwardly toward the top 420 of the electrical modular connector 400 or the top 320 of the connector boot 300 when the curved top 210 contacts with the top edge bar 318 of the passage 310 in a movement of the slide insert 110 moving on the top of connector boot 300 away from the electrical modular connector 400. The straight distal end of the clip 410 may reside inside the recessed bottom 220 of the rotatable hook 200.

As shown in FIGS. 5, 6, 7, and 7A, in one embodiment of the present invention, the quick release device 100 for quickly releasing an electrical modular connector 400 of a network cable 301 from an electrical jack 430 further comprises a pair of retraction arms 580, a first extended end 562 formed on the first finger release arm 540 and a second extended end 564 formed on the second finger release arm 542, wherein the first extended end 562 and the second extended end 564 may be configured extended slightly outwardly against each other, and wherein a first opening 572 is formed on the first extended end 562 and a second opening 574 is formed on the second extended end 564. In one embodiment of the invention, the pair of retraction arms 580 further comprises a first structure arm 582 and a second structure arm 584 and a handle 586, wherein the first structure arm 582 and the second structure arm 584 are connected with the handle 586. The first structure arm 582 may be positioned to pass through the first opening 572 and the second structure arm 584 may be positioned to pass through the second opening 574 so that a movement of the pair of retraction arms 580 away from the electrical jack 430 may cause the first extended end 562 and the second extended end 564 to retract toward each other, which may subsequently cause the first finger release arm 540 and second finger release arm 542 to retract toward each other. In one embodiment of the present invention as shown in FIG. 6, the quick release device may further comprise a handle 586 extended from the pair of retraction arms 580.

Also shown in FIG. 6, in one embodiment of the present invention, a stop bump 113 is further formed on the slide insert 110 between the locking block 730 and the first end 112 of the slide insert 110, wherein the stop bump 113 is configured to have a predetermined position to allow the slide insert to move in a limited distance on in the passage 310.

As shown in FIGS. 8, 9, 10, and 10A, in one embodiment of a quick release device 100 for quickly releasing an electrical modular connector 400 from an electrical jack 430 comprises a slide insert 110 having a first end 112 and a second end 114 opposed to the first end 112, wherein the slide insert 110 is positioned through the passage, wherein the first end 112 faces or is closer to the electrical jack 430 and the second end 114 faces away from the electrical jack 430. In this embodiment of the present invention, a rotatable hook 200 having a free end 204 and a pivot end 202 may be assembled or configured to the first end 112 of the slide insert 110 by the pivot end 202 and an at least one pivot hole 203 formed on the first end 112 so that the rotatable hook 200 can freely pivot on the first end of the slide insert 110 in a rotational manner along a longitudinal direction of the slide insert 110, wherein the slide insert 110 resides on a top 320 of a connector boot 300 and may move forward and backward in a predetermined distance through a passage 310 of the connector boot 300 on the top 320 of the connector boot along the longitudinal direction of the connector boot 300; a locking block 730 formed on the first end 112 of the slide insert 110 with a predetermined length and a predetermined height to block a downward movement of the clip 410 when the locking block 730 is positioned substantially under the clip; a first secured release arm 740 extended from the second end 114 of the slide insert 110; a second secured release arm 742 extended from the second end 114 of the slide insert 110; a first retaining protrusion 750 formed on the first secured release arm 740; a second retaining protrusion 752 formed on the second secured release arm 742; a removal protrusion 780 formed on the second end 114 of the slide insert 110 between the first secured release arm 740 and the second secured release arm 742; at least one recess 314 formed in the passage 310 (one recess shown in FIG. 6 but another one recess hidden inside the passage 310 not shown); wherein the first secured release arm 740 and the second secured release arm 742 are configured to be elastically deformed in response to a pressure applied on the first secured release arm 740 and the second secured release arm 742, wherein the first retaining protrusion 750 and the second retaining protrusion 752 are configured to selectively engage and disengage from the at least one recess 314, and wherein the first retaining protrusion 750 and the second retaining protrusion 752 are disengaged from at least one recess 314 when the first secured release arm 740 and the second secured release arm 742 are pressed to retract toward each other; and a removal tool 800, wherein the removal tool 800 further comprises a pair of release prongs 820 and a grabbing peg 830, wherein the grabbing peg 830 is configured to selectively engage and disengage with the removal protrusion 780, and wherein the pair of release prongs 820 is configured to cause the first secured release arm 740 and the second secured release arm 742 to retract toward each other when the pair of release prongs 820 engage with the first secured release arm 740 and the second secured release arm 742.

As shown in FIG. 9, in one embodiment of the present invention, the pivot end 202 may be configured as a pair of protrusions on the rotatable hook 200 and a pair of recesses formed on the first end 112 of the slide insert 110, having substantially similar dimensions to the size and shape of the pair of protrusions so that the rotatable hook 200 may rotate freely in distal direction 205 on a longitudinal direction of the slide insert 110. The configuration of the pivot end 202 may be in other types, understood by a person having ordinary skill in the art, allowing the rotatable hook 200 to rotate on the pivot end 202.

As shown in FIG. 9, in one embodiment of the present invention, a grabbing aperture 832 with predetermined length, width, and shape is formed on the grabbing peg 830, wherein the predetermined length, width, and size of the aperture 832 is substantially similar to a predetermined length, width, and size of the removal protrusion 780 so that the aperture may be engaged with the removal protrusion 780 and the removal tool can pull the slide insert 110 away from the electrical jack 430. In another embodiment of the present invention, a vice-versa, functionally equivalent arrangement and configuration that may be understood by a person having ordinary skill in the art is to have a protrusion formed on the grabbing peg 830 but an aperture formed on the second end 114 of the slide insert 110 so the grabbing peg 830 may still engaged with the aperture on the slide insert and allow the removal tool to pull the slide insert 110 away from the electrical jack 430.

Also shown in FIG. 9, in one embodiment of the present invention, a stop bump 113 is further formed on the slide insert 110 between the locking block 730 and the first end 112 of the slide insert 110, wherein the stop bump 113 is configured to have a predetermined position to allow the slide insert to move in a limited distance on in the passage 310.

In one embodiment of the present invention as shown in FIG. 9, the first secured release arm 740 is configured to have a fixed-end attached to the second end 114 of the slide insert 110 from where the first secured release arm is extended and have a free end which may be elastically deformed by a pressure from the one of the pair of release prongs 820, and the second secured release arm 742 may be configured similarly as the first secured release arm 740 and elastically deformable to another prong of the pair of release when the pair of release prongs 820 engaged with the first and second secured release arms. In one of the embodiments of the present invention, the elastic deformations of the first secured release arm 740 and the second secured release arm 742 cause the first secured release arm 740 and the second secured release arm 742 to pivot inwardly toward to each other in a manner that the first retaining protrusion 750 on the first secured release arm 740 and the second retaining protrusion 752 on the second secured release arm 742 may be away and disengaged from the at least one recess 314 formed in the passage, which will further enable the movement of the slide insert 110 to be unlock from the passage 310.

In one embodiment of the present invention as shown in FIG. 9, the locking block 730 has a predetermined height sufficient to block the movement of the clip 410 and keep the electrical modular connector 400 to disengage from the electrical jack 430. The slide insert 110 may reside on a top 320 of a connector boot 300 and may pass through a passage 310 of the connector boot 300 backward and forward, parallelly along the top 320 of the connector boot. The slide insert 110 may move to a position wherein the first retaining protrusion 750 and the second retaining protrusion 752 are engaged with the at least one recess 314 formed on the inside of the passage 310 of the connector boot 300, and wherein the locking block 730 is under the clip 410 to prevent the clip 410 from moving toward the top 420 of the electrical modular connector 400.

As shown in FIGS. 8, 9, 10, and 1A, in one embodiment of the present invention, the slide insert 110 is in an unlock position when the first secured release arm 740 and the second secured release arm 742 retract toward each other, which cause the first retaining protrusion 750 and the second retaining protrusion 752 disengaged from the at least one recess 314 and enable the slide insert 110 to move away from the electrical modular connector 400. When the slide insert 110 moves away from the electrical modular connector 400, the locking block 730 also moves away from the clip 410 and rotatable hook 200 may rotate around the pivot end 202 toward a top 420 of the electrical modular connector 400, which causes the clip 410 to move toward the top 420 of the electrical modular connector 400 and releases the electrical modular connector 400 from an electrical jack 430. The rotatable hook 200 comprises a curved top 210 and a recessed bottom 220.

Figure 10:
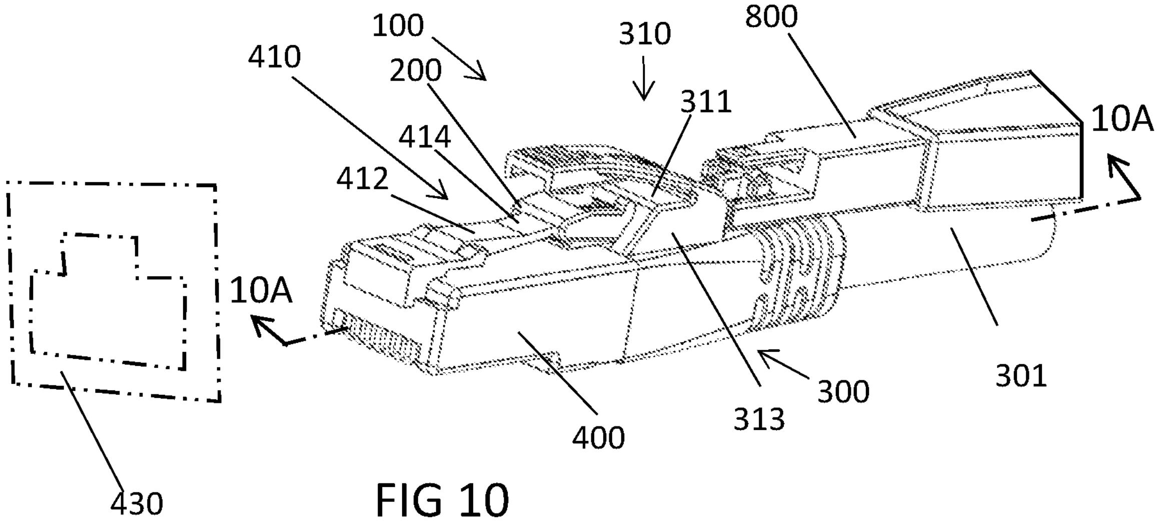
FIG. 10 is a prospective view of one embodiment of the invention when the electrical modular connector is disengaged with the electrical jack.
Figure 10A:
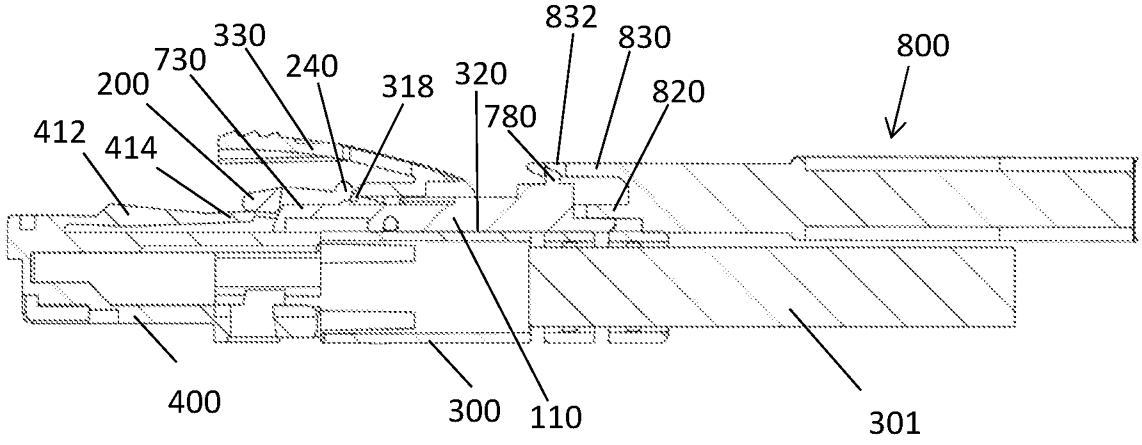
FIG. 10A is a sectional view of one embodiment of the invention depicted on FIG. 10 along section A-A when the electrical modular connector is disengaged with the electrical jack.

In one embodiment of the present invention as shown in FIGS. 9 and 10A, the curved top 210 of the rotatable hook 200 may engage a top edge bar 318 on the of the passage 310 when the slide insert 110 moves away from the electrical modular connector 400. The curved top 210 is arranged to cause the hook to move around the pivot end 202 and angularly toward the top 420 of the electrical modular connector 400 or the top 320 of the connector boot 300 when the curved top 210 contacts with the top edge bar 318 of the passage 310 in a movement of the slide insert 110 moving on the top of connector boot 300 away from the electrical modular connector 400. The straight distal end of the clip 410 may reside inside the recessed bottom 220 of the rotatable hook 200.

As shown in FIGS. 8, 9, 10, and 10A, in one embodiment of the present invention, the removal tool 800 comprises a pair of release prongs 820 and a grabbing peg 830. The pair of release prongs 820 may be positioned to cause the first secured release arm 740 and the second secured release arm 742 to retract toward each other, which further cause the slide insert 110 is in an unlocked position.

As shown in FIGS. 11, in one embodiment of the present invention, a quick release device 1100 for releasing an electrical modular connector 400 of a network cable 301 from an electrical jack 430 comprises a passage 310 formed on the electrical modular connector 400; wherein the passage 310 comprises a first structure 311, a second structure 312, and a third structure 313 together with the top 320 to enclose the passage 310 as a tunnel. The first structure 311, the second structure 312, and third structure 313 can be in a form of wall, panel, bar, stud, rod, frame, or mechanical member that can physically be connected together with a top 401 of the electrical modular connector 400 to enclose the passage 310 as a tunnel; wherein the passage 310 is affixed on the electrical modular connector 400; a slide insert 110 having a first end 112 and a second end 114 opposed to the first end 112, wherein the slide insert 110 is positioned through the passage 310, wherein the first end 112 faces the electrical jack 430; and a rotatable hook 200 having a free end 204 and a pivot end 202 configured to pivot on the first end 112 of the slide insert 110 along a longitudinal direction of the slide insert 110, wherein the free end 204 of the rotatable hook 200 engages with a clip 410 and causes the clip 410 to move relatively downwardly to release the electrical modular connector 400 from the electrical jack 430 when the slide insert 110 moves away from the electrical jack 430. As shown in FIG. 11, in one embodiment of the invention, the electrical modular connector may be assembled with a network cable, configured to be attached to a network cable, or other method a person having ordinary skill in the art would understand and conceive to connect the electrical modular connector with a network cable or other types of cables.

Figure 12A:
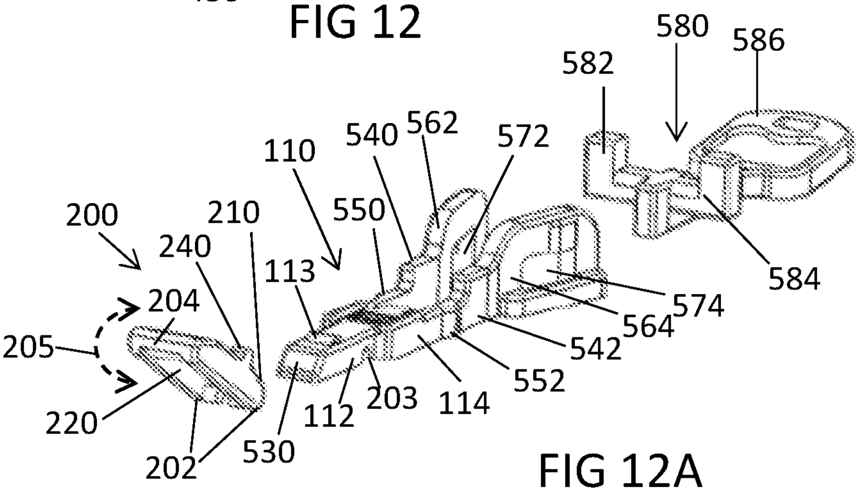
FIG. 12A is a prospective, explosive, detailed view of the one embodiment of hook, slide insert and a pair of restriction arm of the invention.

As shown in FIGS. 12 and 12A, in one embodiment of the present invention, the quick release device 1100 for releasing an electrical modular connector 400 for a network cable 301 from an electrical jack 430 further comprises a pair of retraction arms 580, a first extended end 562 formed on the first finger release arm 540 and a second extended end 564 formed on the second finger release arm 542, wherein the first extended end 562 and the second extended end 564 may be configured extended slightly outwardly against each other, and wherein a first opening 572 is formed on the first extended end 562 and a second opening 574 is formed on the second extended end 564. In one embodiment of the invention, the pair of retraction arms 580 further comprises a first structure arm 582 and a second structure arm 584 and a handle 586, wherein the first structure arm 582 and the second structure arm 584 are connected with the handle 586. The first structure arm 582 may be positioned to pass through the first opening 572 and the second structure arm 584 may be positioned to pass through the second opening 574 so that a movement of the pair of retraction arms 580 away from the electrical jack 430 may cause the first extended end 562 and the second extended end 564 to retract toward each other, which may subsequently cause the first finger release arm 540 and second finger release arm 542 to retract toward each other. In one embodiment of the present invention as shown in FIG. 12, the quick release device may further comprise a handle 586 extended from the pair of retraction arms.

Figure 13A:
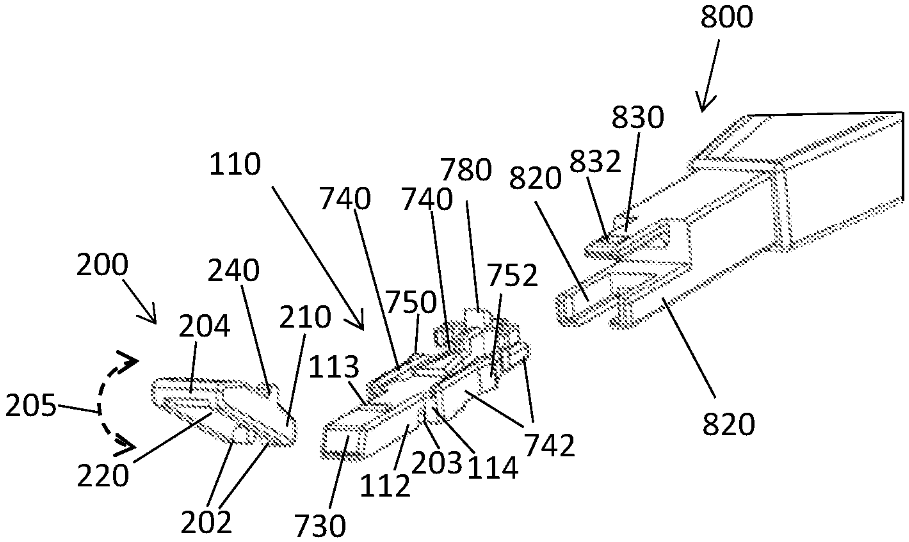
FIG. 13A is a prospective, explosive, detailed view of the one embodiment of hook, slide insert and a removal tool of the invention.

As shown in FIGS. 13 and 13A in one embodiment of a quick release device 1100 for quickly releasing an electrical modular connector 400 from an electrical jack 430 further comprises a first secured release arm 740 extended from the second end 114 of the slide insert 110; a second secured release arm 742 extended from the second end 114 of the slide insert 110; a first retaining protrusion 750 formed on the first secured release arm 740; a second retaining protrusion 752 formed on the second secured release arm 742; a removal protrusion 780 formed on the second end 114 of the slide insert 110 between the first secured release arm 740 and the second secured release arm 742; at least one recess 314 formed in the passage 310 (one recess shown in FIG. 13 but another one recess hidden inside the passage 310 not shown); wherein the first secured release arm 740 and the second secured release arm 742 are configured to be elastically deformed in response to a pressure applied on the first secured release arm 740 and the second secured release arm 742, wherein the first retaining protrusion 750 and the second retaining protrusion 752 are configured to selectively engage and disengage from the at least one recess 314, and wherein the first retaining protrusion 750 and the second retaining protrusion 752 are disengaged from at least one recess 314 when the first secured release arm 740 and the second secured release arm 742 are pressed to retract toward each other; and a removal tool 800, wherein the removal tool 800 further comprises a pair of release prongs 820 and a grabbing peg 830, wherein the grabbing peg 830 is configured to selectively engage and disengage with the removal protrusion 780, and wherein the pair of release prongs 820 is configured to cause the first secured release arm 740 and the second secured release arm 742 to retract toward each other when the pair of release prongs 820 engage with the first secured release arm 740 and the second secured release arm 742.

Having described the subject matter of the present disclosure detailed description of embodiments and examples for purposes of clarity of understanding to a person having ordinary skill in the art that the same can be performed by modifying or changing the subject matter within various conditions, by various formulations and by other parameters without affecting its scope or any specific embodiment thereof, and that such modifications or changes are intended to be encompassed within the scope of the claims.

What is claimed:

1. A quick release device for releasing an electrical modular connector of a network cable from an electrical jack comprising:

a. a connector boot attached to the network cable and assembled with the electrical modular connector;

b. a passage formed on a top side of the connector boot, wherein the passage further comprises a first structure, a second structure, and a third structure together with the top of the connector boot to enclose the passage as a tunnel, wherein the passage is affixed on the connector boot;

c. a slide insert having a first end and a second end opposed to the first end, wherein the slide insert is positioned through the passage, wherein the first end faces the electrical jack; and d. a rotatable hook having a free end and a pivot end configured to pivot on the first end of the slide insert along a longitudinal direction of the slide insert, wherein the free end of the rotatable hook engages with a clip and causes the clip to move relatively downwardly to release the electrical modular connector from the electrical jack when the slide insert moves away from the electrical jack.

2. The quick release device of claim 1 further comprising one slide insert protrusion configured on the slide insert between the passage and the second end of the slide insert to provide a predetermined movement distance of the slide insert through the passage.

3. The quick release device of claim 1, wherein the clip further comprises a body and a straight distal end connected to the body, wherein the free end of the rotatable hook engages with the straight distal end, but the straight distal end is not affixed, snap-fit, or attached with the rotatable hook, and wherein the rotatable hook biases the clip to release the electrical modular connector from the electrical jack when the slide insert moves away from the electrical jack.

4. The quick release device of claim 1 further comprising an aperture formed on a curved top of the rotatable hook, wherein the clip is configured to partially extend through the aperture when the electrical module connector is engaged with the electrical jack.

5. The quick release device of claim 1 further comprising a protrusion formed on a curved top of the rotatable hook, wherein the protrusion can engage with a top edge of the passage to stop the rotatable hook from rotating.

6. The quick release device of claim 5 further comprising a top edge bar configured on the top edge of the passage to engage with the protrusion.

7. The quick release device of claim 1, wherein the electrical modular connector for the network cable is for the electrical jack of a standardized registered jack.

8. The quick release device of claim 1 further comprising a handle configured on the second end of the slide insert.

9. The quick release device of claim 1 further comprising a. a first finger release arm extended from the second end of the slide insert;

b. a second finger release arm extended from the second end of the slide insert;

c. a first retaining protrusion formed on the first finger release arm;

d. a second retaining protrusion formed on the second finger release arm; and e. at least one recess formed in the passage; wherein the first finger release arm and the second finger release arm are configured to be elastically deformed in response to a pressure applied on the first finger release arm and the second finger release arm, wherein the first retaining protrusion and the second retaining protrusion are configured to selectively engage and disengage from the at least one recess, and wherein the first retaining protrusion and the second retaining protrusion are disengaged from the at least one recess when the first finger release arm and the second finger release arm are pressed to retract toward each other.

10. The quick release device of claim 9 further comprising a locking block formed on the first end of the slide insert with a predetermined length and a predetermined height to block a downward movement of the clip when the locking block is substantially positioned under the clip.

11. The quick release device of claim 9 further comprising a pair of retraction arms, a first extended end formed on the first finger release arm, a second extended end formed on the second finger release arm, a first opening formed on the first extended end, a second opening formed on the second extended end, wherein the first extended end and the second extended end are further configured outwardly opposed to each other, wherein the pair of retraction arms is configured to engage the first finger release arm and the second finger release arm through the first opening and the second opening, and wherein the pair of retraction arms causes the first finger release arm and the second finger release arm to retract toward each other when the pair of retraction arms moves away from the electrical jack.

12. The quick release device of claim 11 further comprising a handle extended from the pair of retraction arms.

13. The quick release device of claim 1 further comprising a. a first secured release arm extended from the second end of the slide insert;

b. a second secured release arm extended from the second end of the slide insert;

c. a first retaining protrusion formed on the first secured release arm;

d. a second retaining protrusion formed on the second secured release arm;

e. a removal protrusion formed on the second end of the slide insert between the first secured release arm and the second secured release arm;

f. at least one recess formed in the passage; wherein the first secured release arm and the second secured release arm are configured to be elastically deformed in response to a pressure applied on the first secured release arm and the second secured release arm, wherein the first retaining protrusion and the second retaining protrusion are configured to selectively engage and disengage from the at least one recess, and wherein the first retaining protrusion and the second retaining protrusion are disengaged from the at least one recess when the first secured release arm and the second secured release arm are pressed to retract toward each other; and g. a removal tool, wherein the removal tool further comprises a pair of release prongs and a grabbing peg, wherein the grabbing peg is configured to selectively engage and disengage with the removal protrusion, wherein the pair of release prongs are configured to cause the first secured release arm and the second secured release arm to retract toward each other when the pair of release prongs engage with the first secured release arm and the second secured release arm.

14. The quick release device of claim 1 further comprising a locking block formed on the first end of the slide insert with a predetermined length and a predetermined height to block a downward movement of the clip when the locking block is positioned substantially under the clip.

15. A quick release device for releasing an electrical modular connector attached with a network cable from an electrical jack comprising:

a. a passage formed on the electrical modular connector, wherein the passage comprises a first structure, a second structure, and a third structure together with a top of the electrical modular connector to enclose the passage as a tunnel, wherein the passage is affixed on the electrical modular connector;

b. a slide insert having a first end and a second end opposed to the first end, wherein the slide insert is positioned through the passage, wherein the first end faces the electrical jack; and c. a rotatable hook having a free end and a pivot end configured to pivot on the first end of the slide insert along a longitudinal direction of the slide insert, wherein the free end of the rotatable hook engages with a clip and causes the clip to move relatively downwardly to release the electrical modular connector from the electrical jack when the slide insert moves away from the electrical jack.

16. The quick release device of claim 15 further comprising a. a first finger release arm extended from the second end of the slide insert;

b. a second finger release arm extended from the second end of the slide insert;

c. a first retaining protrusion formed on the first finger release arm;

d. a second retaining protrusion formed on the second finger release arm; and e. at least one recess formed in the passage; wherein the first finger release arm and the second finger release arm are configured to be elastically deformed in response to a pressure applied on the first finger release arm and the second finger release arm, wherein the first retaining protrusion and the second retaining protrusion are configured to selectively engage and disengage from the at least one recess, and wherein the first retaining protrusion and the second retaining protrusion are disengaged from the at least one recess when the first finger release arm and the second finger release arm are pressed to retract toward each other.

17. The quick release device of claim 16 further comprising a locking block formed on the first end of the slide insert with a predetermined length and a predetermined height to block a downward movement of the clip when the locking block is substantially positioned under the clip.

18. The quick release device of claim 15 further comprising a. a first secured release arm extended from the second end of the slide insert;

b. a second secured release arm extended from the second end of the slide insert;

c. a first retaining protrusion formed on the first secured release arm;

d. a second retaining protrusion formed on the second secured release arm;

e. a removal protrusion formed on the second end of the slide insert between the first secured release arm and the second secured release arm;

f. at least one recess formed in the passage; wherein the first secured release arm and the second secured release arm are configured to be elastically deformed in response to a pressure applied on the first secured release arm and the second secured release arm, wherein the first retaining protrusion and the second retaining protrusion are configured to selectively engage and disengage from the at least one recess, and wherein the first retaining protrusion and the second retaining protrusion are disengaged from the at least one recess when the first secured release arm and the second secured release arm are pressed to retract toward each other; and g. a removal tool, wherein the removal tool further comprises a pair of release prongs and a grabbing peg, wherein the grabbing peg is configured to selectively engage and disengage with the removal protrusion, wherein the pair of release prongs are configured to cause the first secured release arm and the second secured release arm to retract toward each other when the pair of release prongs engage with the first secured release arm and the second secured release arm.

19. The quick release device of claim 18 further comprising a locking block formed on the first end of the slide insert with a predetermined length and a predetermined height to block a downward movement of the clip when the locking block is positioned substantially under the clip.

20. The quick release device of claim 15, wherein the clip further comprises a body and a straight distal end connected to the body, wherein the free end of the rotatable hook engages with the straight distal end, but the straight distal end is not affixed, snap-fit, or attached with the rotatable hook, and wherein the rotatable hook biases the clip to release the electrical modular connector from the electrical jack when the slide insert moves away from the electrical jack.

* * * * *